United States Patent
Siczek et al.

(10) Patent No.: US 9,631,497 B2
(45) Date of Patent: Apr. 25, 2017

(54) WEB MATERIAL TEST STAND HAVING A LAMINAR AIRFLOW DEVELOPMENT DEVICE

(71) Applicant: The Procter & Gamble Company, Cincinnati, OH (US)

(72) Inventors: Pawel Marek Siczek, Liberty Township, OH (US); Gustav André Mellin, Amberley Village, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 132 days.

(21) Appl. No.: 14/577,024

(22) Filed: Dec. 19, 2014

(65) Prior Publication Data

US 2016/0177729 A1  Jun. 23, 2016

(51) Int. Cl.
*G01L 5/04* (2006.01)
*F01D 5/14* (2006.01)
*G01M 9/04* (2006.01)

(52) U.S. Cl.
CPC .............. *F01D 5/147* (2013.01); *G01M 9/04* (2013.01)

(58) Field of Classification Search
CPC .... G01M 9/04; G01M 9/062; G01M 17/0074; B65H 2220/01; B65H 2220/03; G01N 33/346; G01N 2203/0282; G01N 3/08; G01N 33/36; G01N 33/365; G01N 2203/0278; G01N 2291/0237; G01N 33/34
USPC .................................... 73/159, 147
See application file for complete search history.

(56) References Cited

U.S. PATENT DOCUMENTS

| | | | |
|---|---|---|---|
| 3,768,119 A | 10/1973 | Wood | |
| 4,947,686 A | 8/1990 | Wendell et al. | |
| 5,967,457 A | 10/1999 | Wildenberg et al. | |
| 6,526,821 B1 | 3/2003 | Corda et al. | |

(Continued)

FOREIGN PATENT DOCUMENTS

DE     102011054434 A1     4/2013

OTHER PUBLICATIONS

Bhattacharjee, D. & Kothari, V. K., Prediction of thermal resistance of woven fabrics. Part II: Heat transfer in natural and forced convective environments, The Journal of the Textile Institute, vol. 99(5), pp. 433-449 (2008).

(Continued)

*Primary Examiner* — Helen Kwok
*Assistant Examiner* — Nashmiya Fayyaz
(74) *Attorney, Agent, or Firm* — Peter D. Meyer

(57) ABSTRACT

A laminar air flow development device for use with stationary web material testing equipment is disclosed. The laminar air flow development device has a machine direction, a cross-machine direction orthogonal thereto, and a Z-direction orthogonal to both the machine and cross-machine directions. The stationary web material testing equipment has a first web material support having a Z-direction thickness, D. The device has first and second surfaces contactingly and matingly engaged to form an airfoil having a machine direction length, L, a cross-machine direction width, a leading edge, and a trailing end. The airfoil has a chord disposed between the first and second surfaces. The trailing end has a width equal to the Z-direction thickness, D. The device has a ratio of L/D ranging from about 1 to about 70 and provides machine direction laminar air flow to at least one surface of the first web material support.

20 Claims, 10 Drawing Sheets

(56) References Cited

U.S. PATENT DOCUMENTS

| | | |
|---|---|---|
| 8,042,386 B2 | 10/2011 | Kato et al. |
| 2004/0251370 A1* | 12/2004 | Solberg ............... B29C 47/0021 242/420.6 |
| 2008/0029237 A1* | 2/2008 | Urbanek ................ D21F 11/14 162/193 |
| 2010/0175465 A1 | 7/2010 | Kato et al. |

OTHER PUBLICATIONS

Chowdhury, H. & Alam, F., An experimental investigation on the aerodynamic drag coefficient and surface roughness properties of sport textiles, The Journal of the Textile Institute, vol. 105(4), pp. 414-422 (2014).

Yamaguchi, N., et al., Flutter Limits and Behaviors of Flexible Webs Having a Simplified Basic Configuration in High-Speed Flow, J. Fluids Eng, vol. 125(2), pp. 345-353 (Mar. 27, 2003).

PCT International Search Report, mailed Mar. 30, 2016, 124 pages.

\* cited by examiner

WEB MATERIAL TEST STAND HAVING A LAMINAR AIRFLOW DEVELOPMENT DEVICE

FIELD OF THE INVENTION

The present disclosure relates to devices suitable for the development of laminar air flow for web material test stands. The present disclosure more particularly relates to devices suitable for the development of laminar air flow for testing web materials disposed upon test stands that more suitably simulate real-time web material handling in typical operating environments.

BACKGROUND OF THE INVENTION

Wind tunnels are used in aerodynamic research to study the effects of air moving past solid objects. A wind tunnel can generally consist of a passage with the object under test disposed and/or mounted therein. Air is made to move past the object by a fan system or other means. The test object, sometimes called a wind tunnel model, can be provided with instruments having suitable sensors to measure aerodynamic forces, pressure distribution, or other aerodynamic-related characteristics observed by the test object.

Referring to FIG. 1, in the world of consumer products, such as paper toweling, bath tissue products, and facial tissue products, wind tunnel 10 tests can be used to suitably measure simulated air velocities, forces, and/or pressures exerted upon a web material 18 while the web material 18 is conveyed from one location to another. Such conveying is known to those of skill in the art as converting.

Referring to the exemplary prior art wind tunnel 10 of FIGS. 1 and 2, air 32 (or airstream 32) is blown or sucked through a duct equipped with instrumentation where an object (here presented as web material test stand 12) is positioned for study. Typically the air 32 is moved through the wind tunnel 10 using a wind generating device 14 in the form of a fan 30. For very large wind tunnels that are several meters in diameter, a single large fan may not be practical, and so instead an array of multiple fans 30 can be used in parallel to provide sufficient air flow through the wind tunnel 10.

In a typical web material 18 wind tunnel 10 set-ups, a test stand 12 can provide for a web material 18 to be attached to a web material support 16. The web material support 16 will typically be provided as a roller, turn bar, or the like having a nominal diameter, or Z-direction thickness, D. In most applications, the web material support 16 will be provided to represent typical web material 18 handling equipment used in the production of consumer products such as paper toweling, bath tissue, facial tissue, as well as web materials 18 suitable for the production of assembled articles such as diapers, catamenial devices, and the like.

During wind tunnel testing of web materials 18, any turbulence 34 present in air 32 has a deleterious effect upon the analysis of the web material 18 disposed upon test stand 12. Thus, in order to suitably test web materials 18 disposed upon test stand 12 it is preferred that the air 32 moving through the wind tunnel 10 be relatively turbulence-free and laminar.

Web materials 18, including web materials 18 having high surface texturing, such as unusual or complicated shapes are generally analyzed in wind tunnels 10 in order to understand boundary layer air (i.e., air located proximate to web material 18). Such testing can provide the necessary design analysis to help in the development of equipment for the handling of web materials 18, especially web materials 18 that preferably move at high rates of speed during converting operations.

However, it is a common problem experienced by those of skill in the art that the air 32 provided by the wind generating device 14 becomes turbulent 34 upon contact with the relatively blunt leading edge surface of web material support 16. This turbulent air 32 negatively impacts the analysis of web materials 18. This includes those web materials 18 having high surface texturing.

Another issue that can arise with such test stands 10 as described supra, is the effect of the application of a tension, T, to the web material 18 attached to the test stand 10. One of skill in the art will understand that typical web materials 18 used in the production of the articles mentioned supra are typically subjected to high tensions in order to secure the most efficacious winding, effect a complimentary registration of the web material 18 relative to a particular portion of the manufacturing operation, or even the registration of one web material 18 to another web material 18. Applying a tension to the web material 18 disposed upon the test stand 10 assists the analysis of the web material in conditions that more accurately simulate actual manufacturing conditions.

To note, it should be readily understood that web materials 18 used in the production of paper toweling, bath tissue, or facial tissue are typically thin (e.g., have a caliper ranging from about 0.005 inches to about 0.020 inches) and have a very low basis weight (e.g., about 5 pounds/3,000 ft$^2$ to about 30 pounds/3,000 ft$^2$). In other words, the web materials 18 used in the production of paper toweling, bath tissue, or facial tissue are really quite delicate. Additionally, the rolls of web materials used in the production of paper toweling, bath tissue, or facial tissue typically have large cross-machine direction widths—typically in the order of 100 inches. When these thin, low basis weight, and large width web materials 18 are moved at typical manufacturing speeds (e.g., about 2,000 ft/min to about 4,000 ft/min) and at typical manufacturing web tensions (e.g., about 30 g/inch to about 120 g/inch), the web handling equipment used to manufacture these products (such as web material support 16) are designed to have low inertia.

Low inertial components are necessary to avoid breaking or otherwise damaging these otherwise delicate web materials 18. Designing low inertial equipment suitable for the above described converting operations requires that such equipment be manufactured from materials that have good mechanical (e.g., structural) strength and are light weight (i.e., low mass). Designing such low inertia equipment from traditional construction materials (such as steel) or from modern high-strength materials (such as carbon fiber), combined with the lengths of the equipment necessary to handle these high-width web materials results in web handling equipment having a high bend modulus (or bending moment).

One of skill in the art would understand that bending moment is the reaction induced in a structural element when an external force or moment is applied to the element causing the element to bend. The internal reaction loads in a cross-section of the web material support 16 can be resolved into a resultant force and a resultant couple. For equilibrium, the moment created by external forces (and external moments) are balanced by the coupling induced by any internal loads. This resultant internal coupling is called the bending moment.

Such is the typical case when a web material support 16 is caused to support a web material 18 having a low basis weight and large width, under high tension in a typical converting application. In principle, FIG. 3 shows a beam (here web material support 16) which is simply supported at both ends. In other words, each end of the web material support 16 can rotate but has little to no bending moment. This means that the ends of the web material support 16 only react to a shear load. As shown, when a wide web material 18 is subjected to an applied tension, T, it is not uncommon for a low inertia web material support 16 to deform in the manner of web material support 16' in the direction of the applied tension, T. This is akin to a beam structural element that is subjected to a bending moment.

Additionally, the web material support 16 experiences deformation caused by the external load applied to the web material support 16 by the air moved within the wind tunnel 10 as it impacts the leading edge of the web material support 16. The deformation is generally caused by a strain or a stress field induced by the impact of air upon the low inertia device (e.g., web material support 16). In most cases, the deformations experienced by the web material support 16 can be elastic. This can cause erroneous measurements due to a changing deformation in the web material support 16 due to changes in the tension applied to the web material 18, the changing geometry of the web material support 16, or even changes in the velocity or volume of air impinging upon the leading edge of web material support 16. Additionally, deformations in the web material support 16 can cause variations in both the MD and CD length of the web material 18. In other words, a first portion of the web material 18 can have a displacement relative to an adjacent portion of the web material disposed in either of the MD, CD, or combinations thereof.

Thus, there is a need to provide a device for such web material test stands that provides laminar air flow at the leading edge of a web material support or at the point of attachment of the web material to a web material support. There is also a need to provide a device that can effectively reduce the deformation experienced by a web material support positioned within a wind tunnel. There is also a need to provide a device that can effectively reduce the deformation experienced by a web material disposed upon a web material test stand positioned within a wind tunnel.

SUMMARY OF THE INVENTION

The present disclosure provides for a laminar air flow development device for use with stationary web material testing equipment. The laminar air flow development device has a machine direction, a cross-machine direction orthogonal thereto, and a Z-direction orthogonal to both the machine and cross-machine directions. The stationary web material testing equipment has a first web material support having a Z-direction thickness, D. The device has first and second surfaces contactingly and matingly engaged to form an airfoil having a machine direction length, L, a cross-machine direction width, a leading edge, and a trailing end. The airfoil has a chord disposed between the first and second surfaces. The trailing end has a width equal to the Z-direction thickness, D. The device has a ratio of L/D ranging from about 1 to about 70 and provides machine direction laminar air flow to at least one surface of the first web material support.

The present disclosure also provides for a laminar air flow development device for use with stationary web material testing equipment having a machine direction, a cross-machine direction orthogonal thereto, and a Z-direction orthogonal to both the machine and cross-machine directions. The stationary web material testing equipment has a first web material support having a Z-direction thickness, D. The device has first and second surfaces having a machine direction length, L, and a cross-machine direction width. The first and second surfaces are symmetrically disposed about a plane formed in the machine and cross-machine directions. The device has a leading edge and a trailing end. The trailing end has a maximum and minimum thickness equal to the Z-direction thickness, D, of the first web material support and is cooperatively disposed proximate thereto. The first and second surfaces are contactingly and matingly engaged at the leading edge to form a parabolic shape relative to the machine direction. The device has a ratio of L/D ranging from 1 to about 70 and provides machine direction laminar air flow to at least one surface of the first web material support.

DETAILED DESCRIPTION

As used herein, "Machine Direction" (MD) means the direction parallel to the path or flow of a web material 18 through product manufacturing equipment. "Cross-Machine Direction" (CD) means the direction perpendicular to the machine direction in the plane of the web material 18. "Z-direction" is the direction orthogonal to both the machine- and cross-machine directions.

Figure 1:
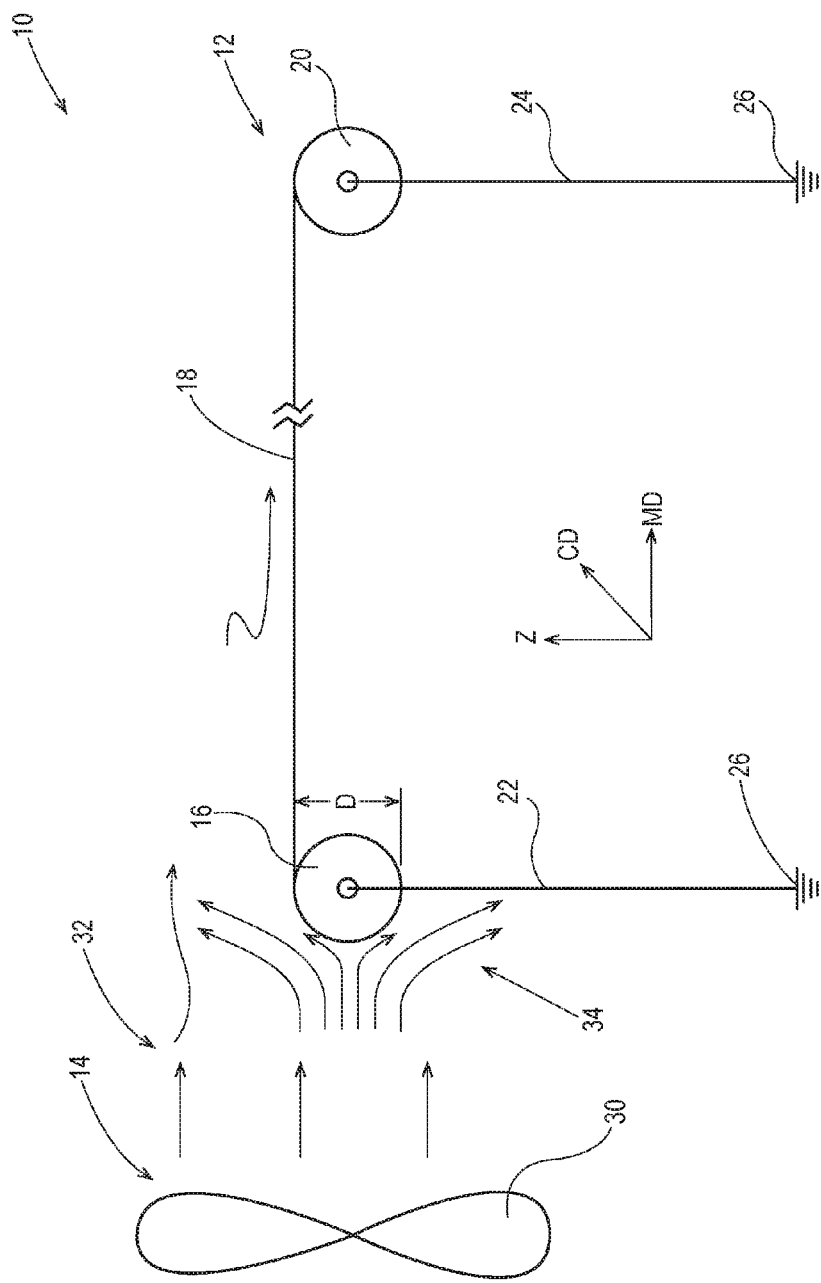
FIG. 1 is a cross-sectional view of an exemplary prior art wind tunnel having a web material test stand disposed therein.
Figure 2:
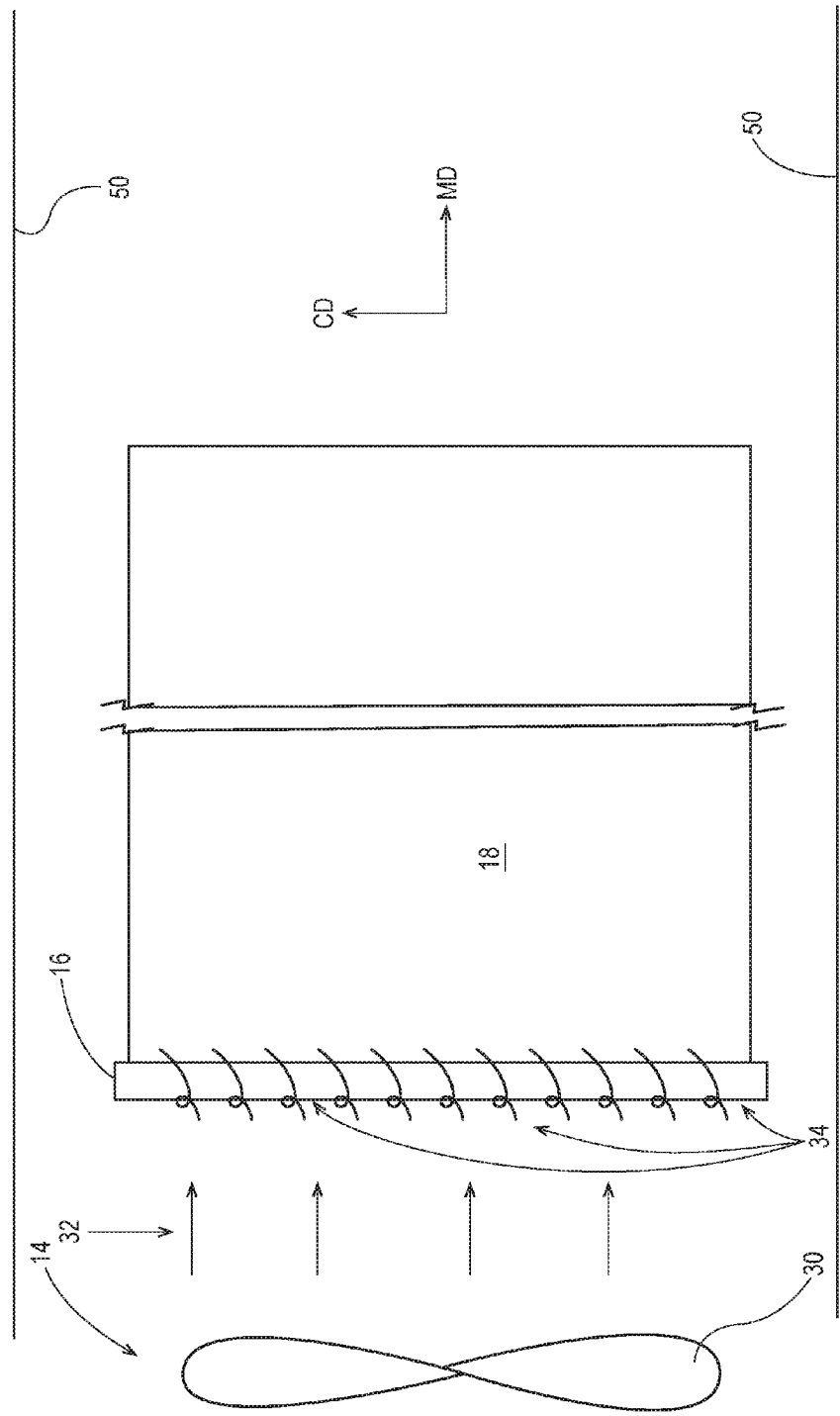
FIG. 2 is a plan view of the exemplary prior art wind tunnel of FIG. 1 having a web material test stand disposed therein.
Figure 3:
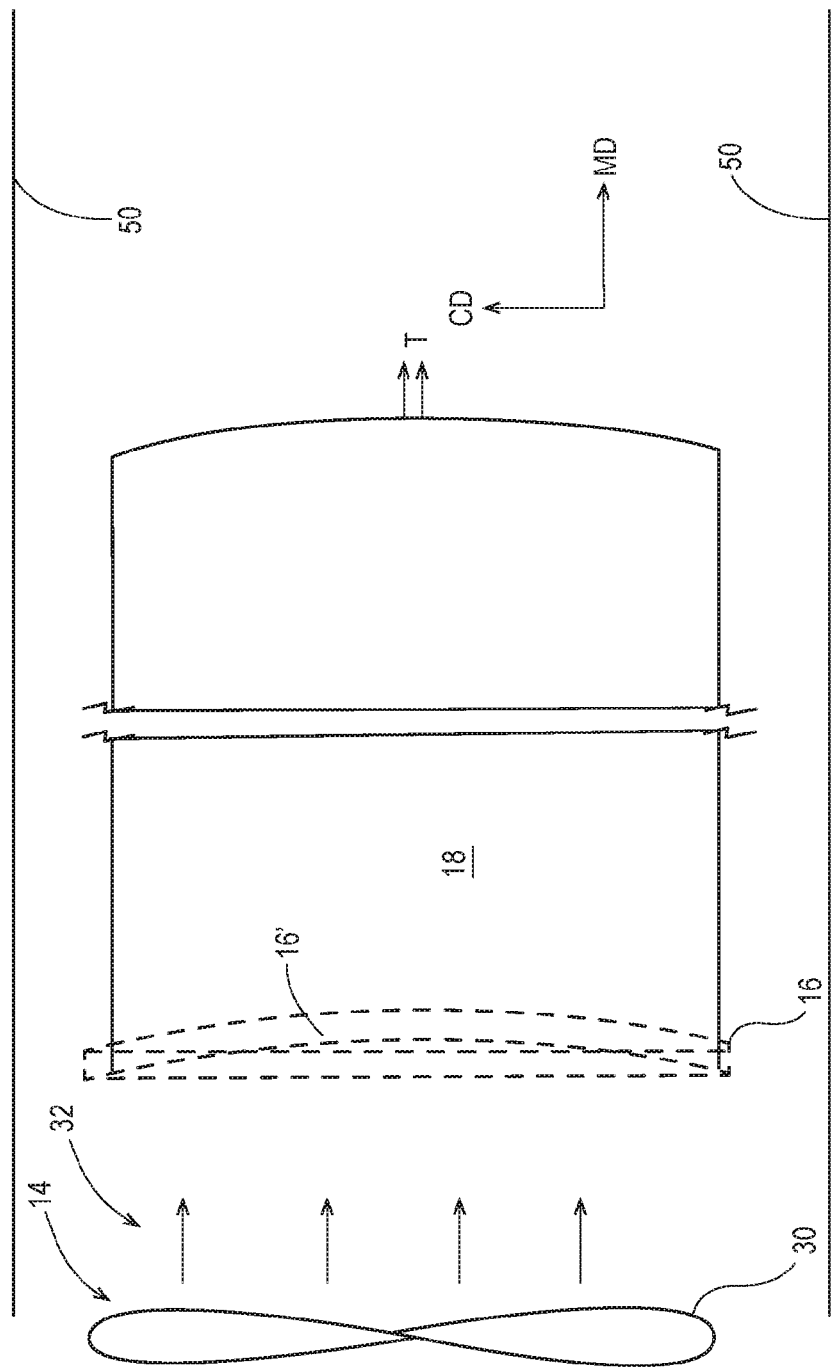
FIG. 3 is a plan view of the exemplary prior art wind tunnel of FIG. 1 having a web material test stand disposed therein showing the deformation of the web material support due to an applied tension to the web material.

FIGS. 1-3 provide a schematic view showing an exemplary prior art wind tunnel measurement apparatus 10. As shown, a wind tunnel 10 can include walls 50 and test stand 12. Each of the two walls 50 has a flat surface parallel to the machine direction. The two walls 50 are preferably arranged at a predetermined distance from each other in the cross-machine direction. The space between the walls 50 defines an area for placement of the test stand 12.

The test stand 12 is arranged so that during web material 18 testing, the test stand 12 is disposed within the flow path or air 32 generated by a fan 30 that is provided in fluid communication with wind tunnel 10 within the area defined by walls 50. Test stand 12 is typically secured (anchored) or otherwise attached to a mounting surface 26 though web material support mount 22 that is operatively connected to web material support 16 and through a second web material support mount 24 that can be operatively connected to a second web material support 20 if it is so needed.

Operatively, a fluid (e.g., air 32) generated by fan 30 flows through the wind tunnel 10 defined by walls 50 around test stand 12 and over a surface of a web material 18 that is operatively attached to a surface of test stand 12. It was found that any air 32 that impacted the leading edge of web material support 16 immediately became turbulent 34. This means that the air 32 impacted the leading edge of web material support 16 and then failed to provide laminar flow over the surface of web material 18 contactingly engaged and attached to web material support 16 at a first edge. This negatively impacted the ability to study the behavior of web material 18.

Additionally, when web material 18 was subjected to an applied MD tension, T, it was observed that web material support 16 would tend to deflect and deform in the MD. If the applied MD tension, T, was sufficient, the web material support 16 would assume a deformed, arcuate-shaped web material support 16' thereby causing MD deformation in web material 18 as well as the generation of an induced CD deformation as well as a CD tension. The arcuate shaping 16' of web material support 16 was further exacerbated by the presence of high velocity air 32. Without desiring to be bound by theory, while it is believed that the majority of arcuate deformation 16' of web material support 16 was due to the applied tension, T, some contribution to the deformation of web material support 16 was due to the MD contact of air 32 generated by fan 30 with the leading edge of web material support 16.

Figure 4:
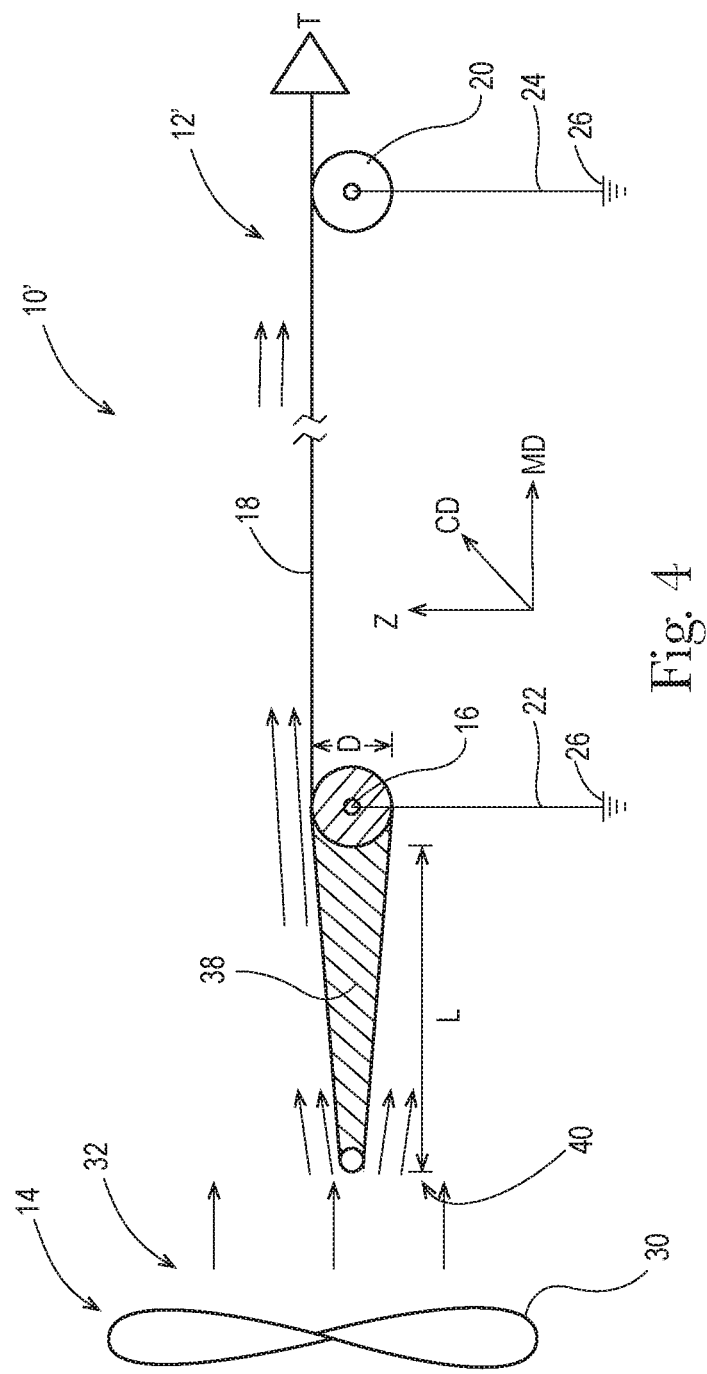
FIG. 4 is a cross-sectional view of an exemplary wind tunnel having an exemplary web material test stand incorporating the exemplary laminar air flow development device described herein cooperatively associated thereto disposed therein.
Figure 5:
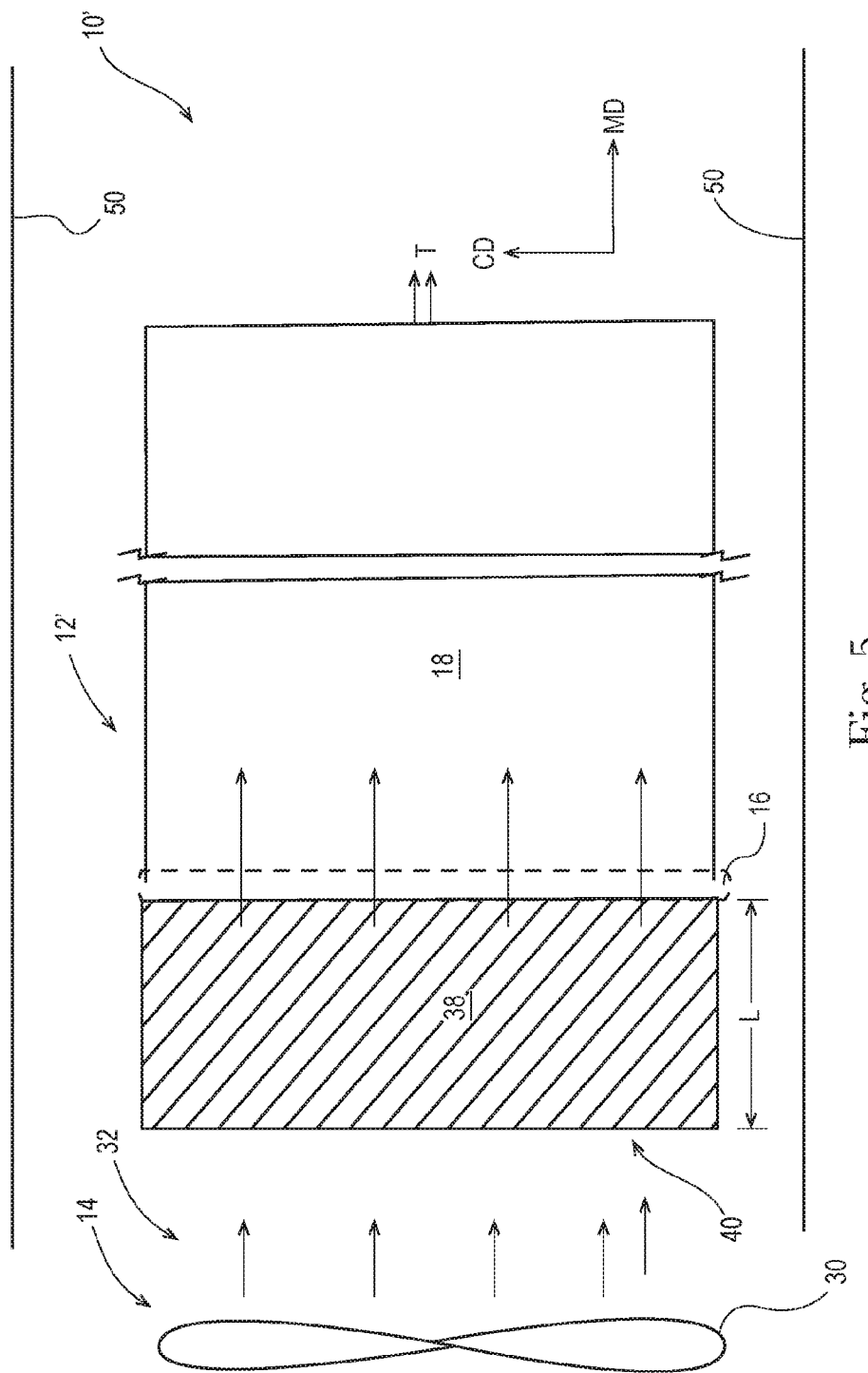
FIG. 5 is a plan view of the exemplary wind tunnel having the exemplary web material test stand incorporating the exemplary laminar air flow development device of FIG. 4.

Referring to FIGS. 4-5, it was surprisingly found that the placement of a laminar airflow development device 38 proximate to, and in some circumstances in contacting engagement with, the leading edge of web material support 16 effectively eliminated the presence of any turbulence 34 in favor of laminar air flow 40 over the surface of laminar airflow development device 38, web material support 16, and any web material 18 operatively and fixably attached thereto.

Without desiring to be bound by theory, the underlying principle of the laminar airflow development device 38 is a "body designed to provide a desired reaction force when in motion relative to the surrounding air". Although this definition can be generally applied to aircraft airfoils that are in motion relative to the surrounding air, it can also apply to an airfoil that is stationary and the air is in motion relative to the airfoil. This is because in both cases, the reaction force results from the physical act of displacing the air from the path it had been on and re-directing it.

The laminar airflow development device 38 can be of almost any shape and be manufactured from almost any material and still reduce the generation of a reaction force of some magnitude. For example, a suitable laminar airflow development device 38 can be constructed from high tensile strength iron, stainless steel, composite fiber, and/or the like. Additionally, a suitable laminar airflow development devices 38 can range from a simple flat plate (e.g., similar to the panels of box-kite), to a curved plate (e.g., the sail on a sailboat), to a complex shape (e.g., the wing on an aircraft) which has some finite thickness resultant from the combination of upper and lower surfaces of different curvature. A reaction force can be generated by either changing direction of the airstream 32 (i.e., by the conservation of momentum) or by splitting an airstream 32 into two parts and forcing each of these streams to take a path of a different length to get past the airfoil (here laminar airflow development device 38) before reuniting to form a single airstream 32 again. Using the Bernoulli principle, the use of a desired shape that prevents the generation of a reactive force by reducing any changes in direction of an impinging airstream 32 and providing a divided airstream 32 that has equal path lengths can reduce the development of turbulence 34 observed by test stand 12 as well as the web material 18 attached thereto.

The magnitude of a reaction force can be related to five factors: (1) the shape of the laminar airflow development device 38; (2) the angle of the laminar airflow development device 38 relative to the air 32 (i.e., the so-called angle of attack); (3) the velocity of the airstream 32; (4) the area of the laminar airflow development device 38; and (5) the density of the air. In applying these factors to the task of managing the somewhat fragile tissue web material 18 that happens to be traveling at high speed, the variability and influence of each of these factors should be considered. Since an objective of the present disclosure is to manage the flow of air 32 traversing the surface of a web material 18, a laminar airflow development device 38 can used to redirect a boundary layer airstream, since a portion of this airstream 32 impacts the flexible tissue web material 18 that is the object of desired study.

One embodiment of a suitable laminar airflow development device 38 design is that of a flat plate. The forces generated on either side of a flat plate laminar airflow development device 38 can be neutral if there is no realized increase in relative airstream 32 velocity on one side of the laminar airflow development device 38 over the other due to the Bernoulli effect. Any change in the angle of attack of the flat plate laminar airflow development device 38 relative to the direction of the air 32 produced by fan 30 will generate some additional force. As such, it is believed that a flat plate is limited to relatively low angles of attack (i.e., the angle of the flat plate laminar airflow development device 38 relative to the reference line or entering airstream 32) in order to keep the airstream 32 from breaking away from the surface of the flat plate laminar airflow development device 38 and becoming turbulent, resulting in the reaction force being greatly diminished.

Figure 8:
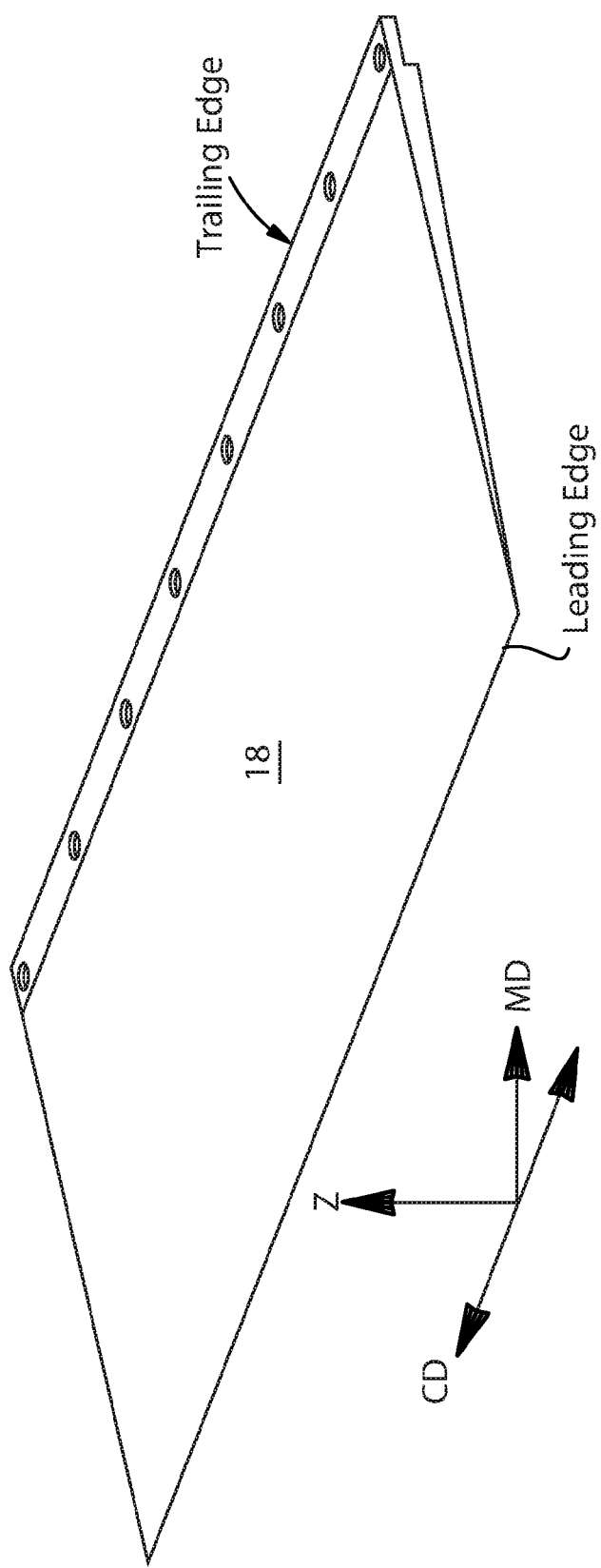
FIG. 8 is a perspective view of an exemplary leading edge suitable for use with the exemplary test stand of FIG. 6.
Figure 9:
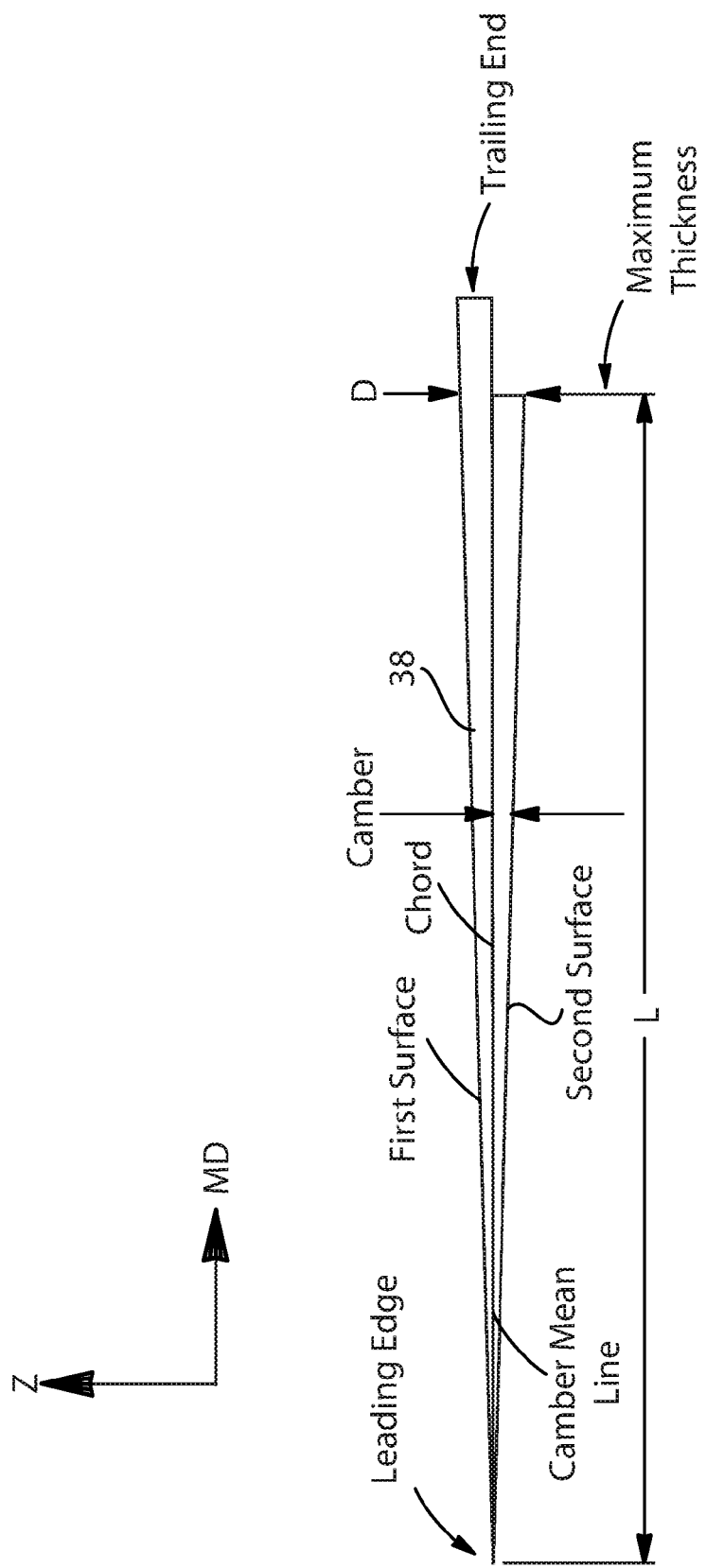
FIG. 9 is a cross-sectional view of the exemplary leading edge of FIG. 8.

Another embodiment of an exemplary laminar airflow development device 38 design is the shape depicted in FIGS. 8-9. Such a curved plate design for laminar airflow development device 38 would likely derive most of its reaction force from any angular changes in direction of the airstream 32. In other words, little force is generated by the Bernoulli effect. This is because as the only increase in airstream 32 velocity on the side farthest from the reference line is due to the lengthened path parallel to, and outwardly stepped from, the radius of curvature of the upper surface of the curved plate. The curved plate laminar airflow development device 38 is a more stable airfoil design than the flat plate laminar airflow development device 38 because the entry and exit airstreams 32 are generally tangent to the curvature of the laminar airflow development device 38. This tangential flow avoids having the air 32 change direction abruptly and therefore reduces the potential of the airstream 32 separating from the surface of the laminar airflow development device 38 attached thereto.

Figure 10:
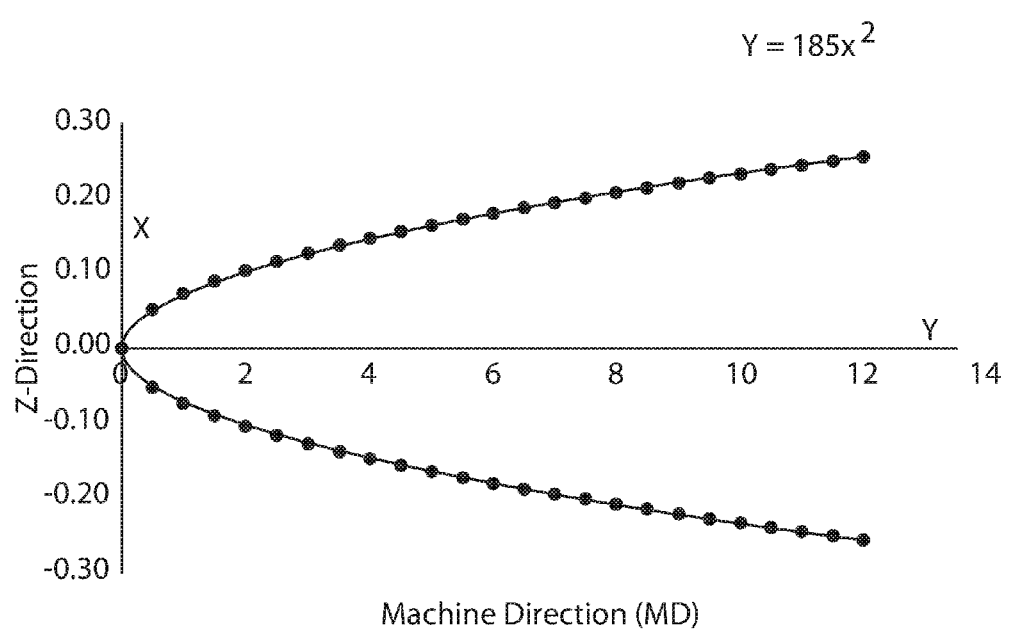
FIG. 10 is a cross-sectional view of an exemplary leading edge for an exemplary laminar air flow development device satisfying the equation $y=185x^2$.

As shown in FIG. 9, the exemplary laminar airflow development device 38 having an overall length, L, provides first and second surfaces that are contactingly and matingly engaged and disposed about the chord of the laminar airflow development device 38. In a preferred embodiment the first and second surfaces that are contactingly and matingly engaged and symmetrically disposed about the chord of the laminar airflow development device 38. Here the camber mean line is the same as the chord due to the symmetrical nature of the laminar airflow development device 38 shown. The maximum thickness (as well as the trailing end) of the laminar airflow development device 38 shown has a maximum and minimum thickness equal to the Z-direction thickness, D, of the desired first web material support 16 of test stand 12. Preferably, the laminar airflow development device 38 has a leading edge that has a parabolic shape disposed symmetrically about a plane formed in the Z-direction and the CD. Preferably, the length, L, of laminar airflow development device 38 is provided relative to the Z-direction thickness, D, of the first web material support 16 and ranges from about 1 to about 70, or from about 2 to about 50, or from about 4 to about 30, or from about 5 to about 25, or about 7 to about 20, or from about 10 to about 15. As shown in FIG. 10, a cross-sectional view of an exemplary preferred embodiment of the laminar airflow development device 38 that extends in the CD is provided with a leading edge having a parabolic shape that satisfies the equation $y=185x^2$ where the x and y Cartesian coordinates correspond to the Z-direction and MD, respectively.

Additionally, it is believed that airfoils developed by the National Advisory Committee for Aeronautics (NACA) can be suitable for use as laminar airflow development device 38. An exemplary formula for designing a suitable symmetric NACA foil is:

$$y_t = \frac{t}{0.2}c\left[0.2969\sqrt{\frac{x}{c}} + (-0.1260)\left(\frac{x}{c}\right) + (-0.3516)\left(\frac{x}{c}\right)^2 + 0.2843\left(\frac{x}{c}\right)^3 + (-0.1015)\left(\frac{x}{c}\right)^4\right],$$

where:
c is the chord length,
x is the position along the chord from 0 (leading edge) to c,
$y_t$ is the half thickness at a given value of x (centerline to surface), and
t is the maximum thickness as a fraction of the chord.

Asymmetric NACA foils may also be suitable for use as laminar airflow development device 38. An asymmetric NACA foil may use the same formula as that used to generate a symmetric NACA foil, but with the camber mean line bent. The formula used to calculate the mean camber line of an asymmetric NACA foil is:

$$y_c = \begin{cases} m\dfrac{x}{p^2}\left(2p - \dfrac{x}{c}\right), & 0 \leq x \leq pc \\ m\dfrac{c-x}{(1-p)^2}\left(1 + \dfrac{x}{c} - 2p\right), & pc \leq x \leq c \end{cases}$$

where:
m is the maximum camber (100 m is the first of the four digits), and
p is the location of maximum camber.

Because the thickness of an asymmetric NACA foil needs to be applied perpendicular to the camber line for a cambered laminar airflow development device 38, the coordinates $(x_U, y_U)$ and $x_L, y_L$), of respectively the upper and lower airfoil surface, become:

$$x_U = x - y_t \sin\theta, y_U = y_c + y_t \cos\theta,$$

$$x_L = x + y_t \sin\theta, y_L = y_c - y_t \cos\theta,$$

where:

$$\theta = \arctan\left(\frac{dy_c}{dx}\right), \text{ and,}$$

$$\frac{dy_c}{dx} = \begin{cases} \dfrac{2m}{p^2}\left(p - \dfrac{x}{c}\right), & 0 \leq x \leq pc \\ \dfrac{2m}{(1-p)^2}\left(p - \dfrac{x}{c}\right), & pc \leq x \leq c \end{cases}$$

Figure 6:
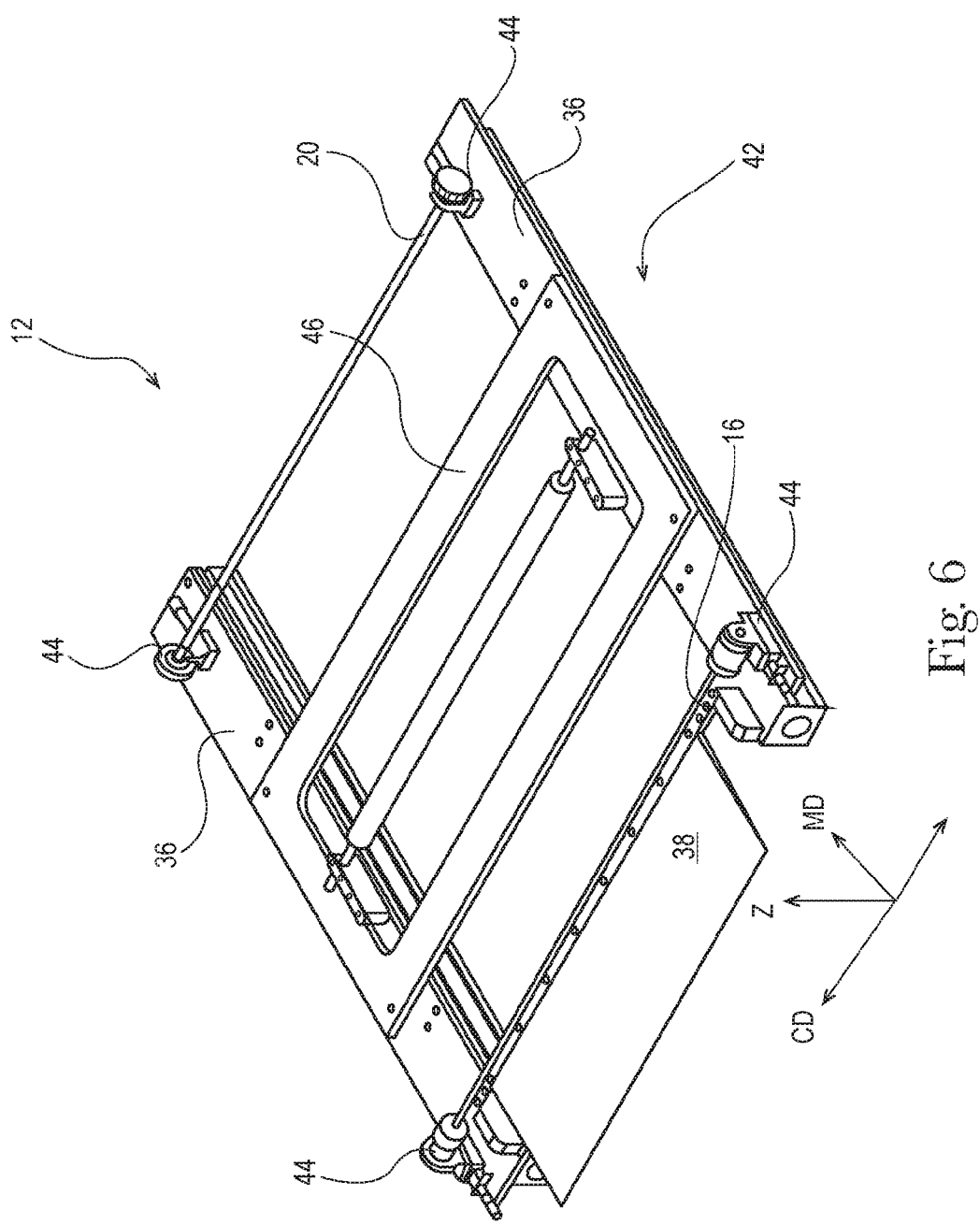
FIG. 6 is a perspective view of another exemplary test stand suitable for testing web materials with a wind tunnel
Figure 7:
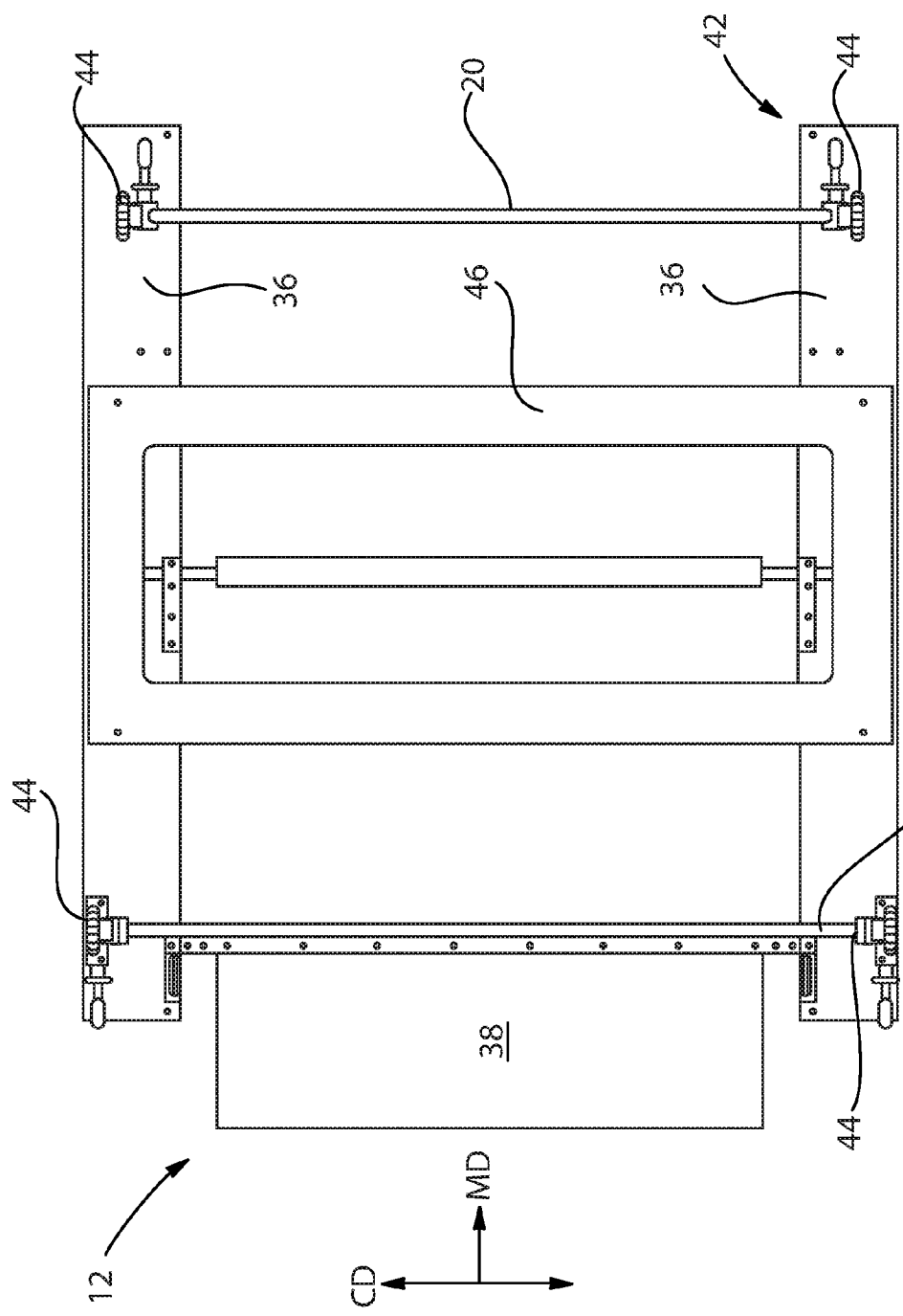
FIG. 7 is a plan view of the exemplary test stand of FIG. 6.

Referring again to FIGS. 6-7, a preferred test stand 12 suitable for use with web material 18 and positionable within wind tunnel 10 and incorporating an exemplary laminar airflow development device 38 is shown. Here, a web material support 16 and a second web material support 20 are juxtaposed one in front of the other to form a point of attachment for a web material 18. The web material support 16 and a second web material support 20 can be positioned into fixed alignment by the attachment of both the web material support 16 and the second web material support 20 by the physical attachment to a pair of spaced rails 36 forming an alignment frame 42. Further, the rails can be attached to each respective rail 36 forming alignment frame 42 through a respective load cell 44.

If desired, a temporary alignment frame 46 can be provided for attachment to alignment frame 42. Temporary alignment frame 46 can be used to ensure that the pair of spaced rails 36 remain parallel to each other and can ensure symmetrical flow patterns around the test stand 12 that could otherwise have a negative effect on any physical measurements performed upon a web material 18 attached thereto.

In one embodiment, web material support 16 and second web material support 20 are constructed from high tensile strength iron, stainless steel, composite fiber, and/or the like. In this embodiment, web material support 16 and second web material support 20 are preferably provided in the form of a rod, square bar or rectangular bar, or other shapes to provide test stand 12 with increased stiffness.

In yet another embodiment, web material support 16 and a second web material support 20 are constructed from a high stiffness carbon fiber material or other high strength to weight ratio materials to eliminate gravitational sagging of the web material support 16 and second web material support 20 in the Z-direction. One of skill in the art would appreciate that a high degree of stiffness in the MD can be easy to achieve but stiffness in the Z-direction can require a high impact geometry thus exacerbating the need for such preferable high strength to weight ratio materials such as carbon fiber and the like.

In one preferred but non-limiting embodiment, laminar airflow development device 38 can be positioned in contacting and fixed relationship to the trailing edge of web material support 16. Such an arrangement would be useful to one of skill in the art for understanding the impact of MD airflow upon a web material transfixed between two points such as web material support 16 and a second web material support 20. Such an arrangement also can provide for the added benefit of reducing the bending moment (i.e., bending modulus) of web material support 16. As discussed supra, web material support 16 can undergo significant bending in the event a tension, T, is applied to web material 18 or due to the impact of air 32 generated by fan 30 upon the leading edge of web material support 16. Thus, laminar airflow development device 38 can provide a beneficial duality of laminar air flow 40 over a web material 18 fixably attached to web material support 16 as well as decrease the bending moment of web material support 16 due to a tension, T, that may be applied to a web material 18 disposed thereon by providing increased rigidity to web material support 16.

In other words, the first material support 16 can be considered to have a first machine direction flexural rigidity. When the first web material support 16 is provided in cooperative, adhered, connective engagement with the trailing end of the laminar airflow development device 38, the first web material support 16 can be now provided with a second machine direction flexural rigidity. Preferably, the second machine direction flexural rigidity is greater than the first machine direction flexural rigidity.

In another preferred but non-limiting embodiment, laminar airflow development device 38 can be spaced proximate to, but in spaced relationship with, the trailing edge of web material support 16. Such an arrangement would allow for the transportation and/or introduction of web material 18 into the space between web material support 16 and laminar airflow development device 38 and into contacting engagement with the web material support 16. By way of non-limiting embodiment, such an arrangement way be useful to one of skill in the art for understanding the impact of airflow upon a web material 18 that may be undergoing a translational positional movement from a direction relative to the Z-direction to a direction relative to the MD.

All publications, patent applications, and issued patents mentioned herein are hereby incorporated in their entirety by reference. Citation of any reference is not an admission regarding any determination as to its availability as prior art to the claimed invention.

The dimensions and/or values disclosed herein are not to be understood as being strictly limited to the exact numerical values recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm".

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A laminar air flow development device for use with stationary web material testing equipment having a machine direction, a cross-machine direction orthogonal thereto, and a Z-direction orthogonal to both said machine and cross-machine directions, said stationary web material testing equipment comprising a first web material support having a Z-direction thickness, D, and said laminar air flow development device comprising an airfoil, said airfoil being formed by contactingly and matingly engaged first and second surfaces and having a machine direction length, L, a cross-machine direction width, a leading edge, and a trailing end, said airfoil having a chord disposed between said first and second surfaces, said trailing end having a width equal to said Z-direction thickness, D, of said first web material support and wherein said laminar air flow development device has a ratio of L/D ranging from about 1 to about 70 and provides machine direction laminar air flow to at least one surface of said first web material support.

2. The device of claim 1 wherein said first and second surfaces are symmetrically disposed about said chord.

3. The device of claim 1 wherein said airfoil is a NACA airfoil.

4. The device of claim 1 wherein said leading edge is a parabolic shape disposed symmetrically about a plane formed by said Z-direction (x) and said cross-machine direction (y).

5. The device of claim 4 wherein said parabolic shape satisfies the equation $y=185x^2$.

6. The device of claim 1 wherein said first material support is provided with a first machine direction flexural rigidity and wherein cooperative, adhered, connective engagement of said trailing end of said device to said first web material support provides a second machine direction flexural rigidity, said second machine direction flexural rigidity being greater than said first machine direction flexural rigidity.

7. The device of claim 1 wherein said stationary web material testing equipment further comprises a second web material support disposed distally away from said first web material support in said machine direction, said web material being disposed between said first and second web material supports.

8. The device of claim 1 wherein said trailing end of said airfoil is positioned proximate to said first web material support, said airfoil providing laminar flow over said first web material support in said machine direction.

9. The device of claim 8 wherein said trailing end of said airfoil is positioned in cooperative, adhered, and connective engagement to said first web material support, said airfoil providing laminar flow over said first web material support in said machine direction, said cooperative, adhered, and connective engagement of the trailing end of said airfoil providing said first web material support with a greater flexural rigidity.

10. The device of claim 1 wherein said ratio of L/D ranges from about 10 to about 15.

11. A laminar air flow development device for use with stationary web material testing equipment having a machine direction, a cross-machine direction orthogonal thereto, and a Z-direction orthogonal to both said machine and cross-machine directions, said stationary web material testing equipment having a first web material support having a Z-direction thickness, D, said laminar air flow development device having first and second surfaces having a machine direction length, L, and a cross-machine direction width, said first and second surfaces being symmetrically disposed about a plane formed in said machine and cross-machine directions, said laminar air flow development device having a leading edge and a trailing end, said trailing end having a maximum and minimum thickness equal to said Z-direction thickness, D, of said first web material support and being cooperatively disposed proximate thereto, said first and second surfaces being contactingly and matingly engaged at said leading edge to form a parabolic shape relative to said machine direction, and wherein said laminar air flow development device has a ratio of L/D ranging from 1 to about 70, said laminar air flow development device providing machine direction laminar air flow to at least one surface of said first web material support.

12. The device of claim 11 wherein said web material is provided with a first edge, said first edge being contactingly adhered to said first web material support.

13. The device of claim 12 wherein said first web material support is provided with a first machine direction flexural rigidity and wherein cooperative, adhered, connective engagement of said trailing end of said laminar air flow development device to said first web material support provides a second machine direction flexural rigidity, said second machine direction flexural rigidity being greater than said first machine direction flexural rigidity.

14. The device of claim 11 wherein said web material is transported into contacting engagement with said first web material support.

15. The device of claim 11 wherein said leading edge is a parabolic shape disposed symmetrically about a plane formed by said Z-direction (x) and said cross-machine direction (y).

16. The device of claim 15 wherein said parabolic shape satisfies the equation $y=185x^2$.

17. The device of claim 11 wherein said trailing end of said laminar air flow development device is positioned proximate to said first web material support, said laminar air flow development device providing laminar flow over said first web material support in said machine direction.

18. The device of claim 11 wherein said stationary web material testing equipment has a second web material support disposed distally away from said first web material support in said machine direction, said web material being disposed between said first and second web material supports.

19. The device of claim 18 wherein said web material disposed between said first and second web material supports has a machine-direction tension applied thereto.

20. The device of claim 19 wherein said first web material support is provided with a first machine direction flexural rigidity and wherein adhered and connective engagement of said trailing end of said laminar air flow development device to said first web material support provides a second machine direction flexural rigidity, said second machine direction flexural rigidity being greater than said first machine direction flexural rigidity.

* * * * *